United States Patent [19]

Misono et al.

[11] Patent Number: 5,592,195
[45] Date of Patent: Jan. 7, 1997

[54] INFORMATION DISPLAYING DEVICE

[75] Inventors: Shinji Misono; Jung-Kook Hong, both of Tokyo; Kazuo Iwano, Yokohama, all of Japan

[73] Assignee: International Business Machines Corporation, Armonk, N.Y.

[21] Appl. No.: 342,979

[22] Filed: Nov. 21, 1994

[51] Int. Cl.$^6$ ................................................. G09G 1/06
[52] U.S. Cl. .................. 345/146; 345/121; 345/139; 395/119; 395/348
[58] Field of Search ................................ 345/146, 145, 345/139, 121, 123, 126, 125, 127, 118, 131, 133; 395/159, 155, 119, 137

[56] References Cited

U.S. PATENT DOCUMENTS 5,021,976  6/1991  Wexelblat et al. ........................ 345/133

FOREIGN PATENT DOCUMENTS 1179193  7/1989  Japan .

OTHER PUBLICATIONS

Microsoft Windows, User's Guide, 1990–1992 pp. 24–28.

*Primary Examiner*—Kee M. Tung
*Assistant Examiner*—Doon Chow
*Attorney, Agent, or Firm*—Ronald L. Drumheller

[57] ABSTRACT

A storage stores n-dimensional information, n being an integer greater than or equal to three. A display displays an icon which is provided with a central region and a peripheral region surrounding the central region, and displays information, among the n-dimensional information stored in the storage, corresponding to a given displayed region within a two-dimensional cross-section formed in two predetermined dimensions, and displays a cursor. A selector positions the cursor at a desired area of the icon and selects the desired area. A controller controls the display so that the displayed region changes within the two-dimensional cross-section in a direction determined by the central region of the icon and the selected area at a speed corresponding to a distance between the central region and the selected area when an area included in the peripheral region of the icon is selected by the selector, and controls the display so that the displayed region changes in a direction of a third dimension other than the two predetermined dimensions and is positioned within another two-dimensional cross-section formed in the two predetermined dimensions when the central region of the icon is selected by the selector. Movement of displayed portions when multidimensional information is displayed can thereby be effected smoothly.

10 Claims, 11 Drawing Sheets

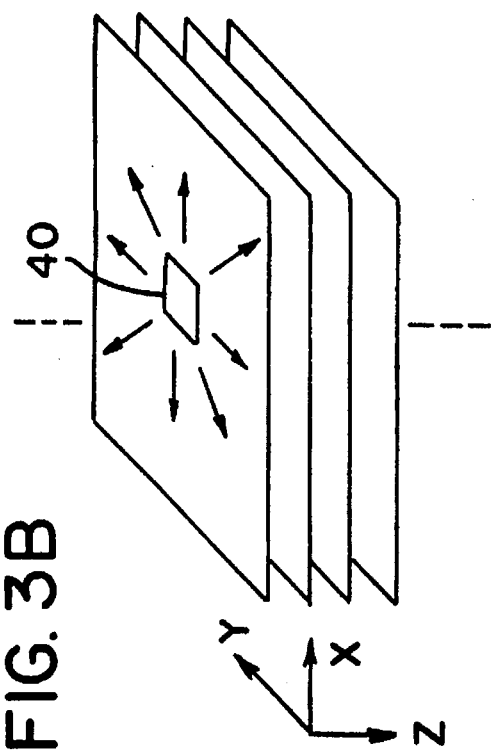
FIG. 3B
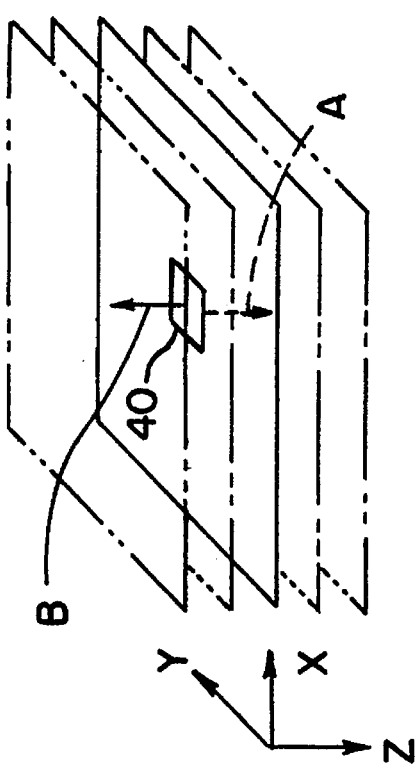
FIG. 3D
FIG. 3A
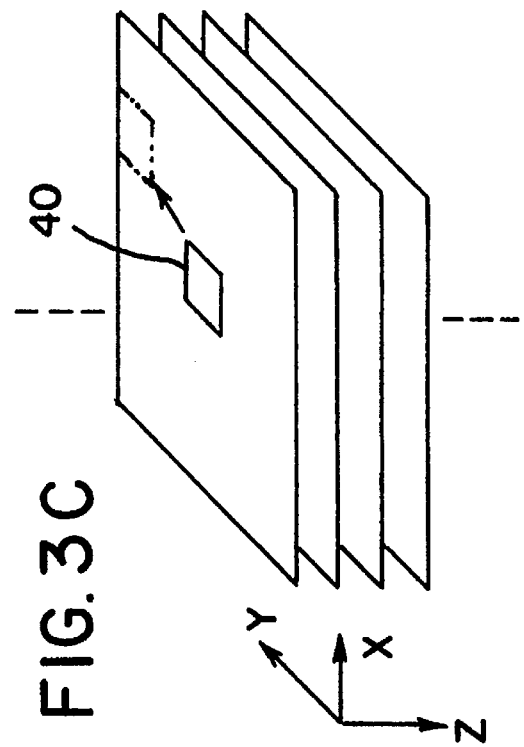
FIG. 3C

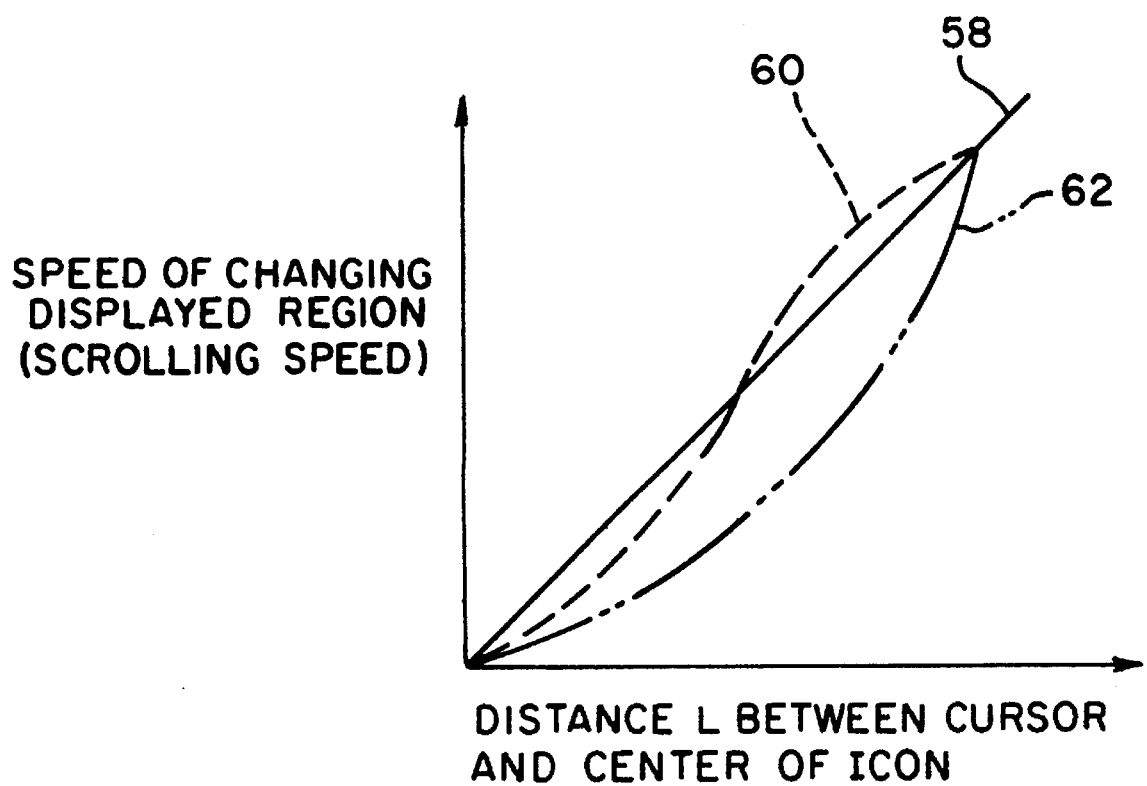

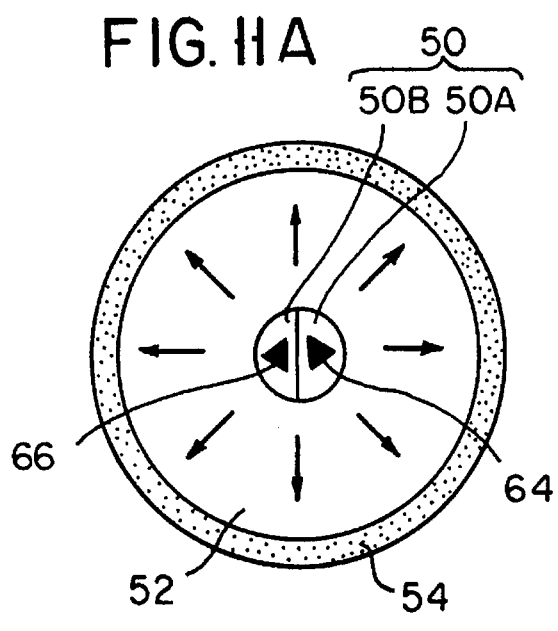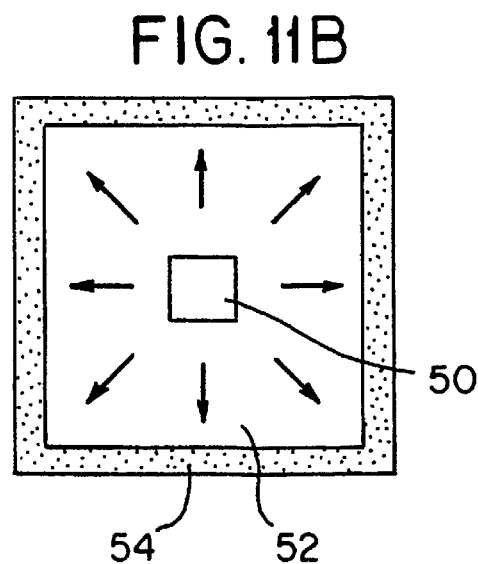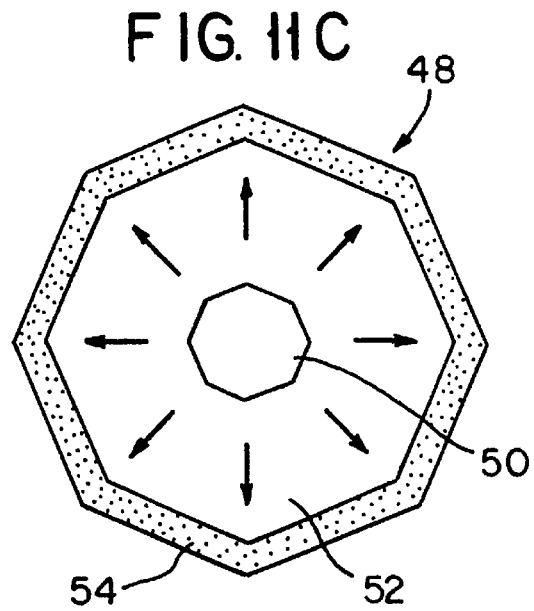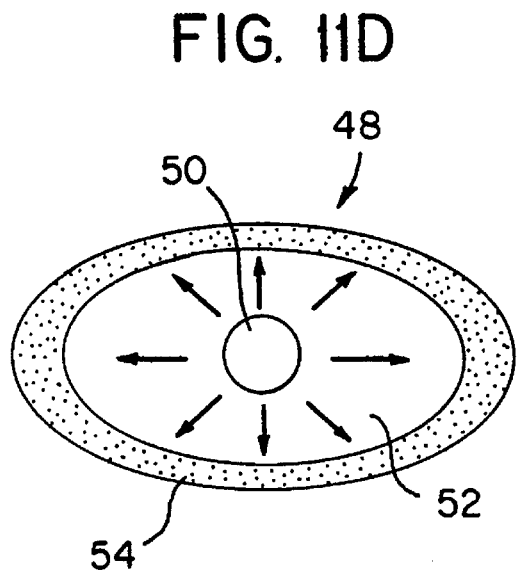

INFORMATION DISPLAYING DEVICE

BACKGROUND OF THE INVENTION

1. Field of the Invention

The present invention relates to an information displaying device, and in particular, to an information displaying device which displays information, from among multidimensional information, which corresponds to a given displayed region within a cross-section with respect to two predetermined dimensions.

2. Description of the Related Art

A display, such as a CRT or a liquid crystal display, is provided as a means for transmitting information to a user at an information processing device such as a computer. Information is supplied to the user through images, characters, or the like being displayed on the display. The size of the display surface of the display is limited. Since a displayable area is limited to the physical size of the display, only a portion of the information can be displayed on the display, and a plurality of icons for designating various, different directions of change (scroll) is displayed. When it is desired to change the displayed region, the user operates a mouse or the like, moves a cursor in the display to an area at which the icon corresponding to the desired direction of change is displayed, and selects the icon. In this way, the displayed region changes on the image, and scrolling of the displayed image is effected.

In fields such as scientific/technological calculation or the like, results of calculation are converted into image data and are displayed in order to facilitate comprehension of the contents of the results of the calculation. Such data is often multidimensional data of three or more dimensions. For example, data may represent dynamical changes of the flow of a two-dimensional fluid, which is projected on a two-dimensional plane, over time (the two-dimensional fluid data+time=three dimensions). Because only a two-dimensional cross-section can be displayed on the display, the display for this type of multi-dimensional data is effected as follows. The third dimension, other than the two which specify the cross-section, is regarded as a new parameter, and a plane at a predetermined value of the new parameter is displayed (e.g., when the new dimension is the time dimension, the plane at a certain time is displayed). The value of the new parameter is changed in accordance with the designation of the user, and the direction of change of the displayed region is switched.

When the value of the parameter corresponding to the new dimension is changed (the direction of change is switched) and the displayed region is changed, conventionally, a plurality of icons for designating changes in directions corresponding to the new dimension are displayed (e.g., when the new dimension is time, the past direction and the future direction). Designation is effected by selecting the icon corresponding to the desired direction. However, generally, the amount of multidimensional data is extensive. In order to retrieve and display a desired portion of the multidimensional data, the changing of the displayed region and the switching of the direction of change are repeated while a portion of the multidimensional data is displayed. Each time the direction of change is switched, the cursor must be moved to another icon. Therefore, work efficiency deteriorates.

Further, as another example of designating scrolling, Japanese Patent Application Laid-Open No. 1-179193 discloses a scrolling method in which the scrolling speed is variable, and the scrolling direction and the scrolling speed can be designated by a single icon. In this scrolling method, the scrolling speed is determined by the distance of the location of the cursor in the icon from a reference point of the icon. The scrolling direction is determined by the position of the cursor with respect to the above-mentioned reference point. Even if the cursor is to be greatly moved, scrolling at an arbitrary speed and in an arbitrary direction can be effected. However, this method is used only to change the displayed region within a plane and does not take into consideration change in a direction corresponding to another dimension. Therefore, workability is low when multidimensional data of three or more dimensions is treated.

SUMMARY OF THE INVENTION

In view of the aforementioned, an object of the present invention is to provide an information displaying device in which changing and the like of displayed portions can be effected smoothly when multidimensional data is displayed.

In order to achieve the above effect, in the first aspect of the present invention, there is provided an information displaying device including: storing means for storing n-dimensional information, n being an integer greater than or equal to three; display means for displaying an icon which is provided with a central region and a peripheral region surrounding the central region, and for displaying information, among the n-dimensional information stored in the storing means, corresponding to a given displayed region within a two-dimensional cross-section formed in two predetermined dimensions, and for displaying a cursor; selecting means for positioning the cursor at a desired area of the icon and for selecting the desired area; and control means for controlling the display means so that the displayed region changes within the two-dimensional cross-section in a direction determined by the central region of the icon and the selected area at a speed corresponding to a distance between the central region and the selected area when an area included in the peripheral region of the icon is selected by the selecting means, and for controlling the display means so that the displayed region changes in a direction of a third dimension other than the two predetermined dimensions and is positioned within another two-dimensional cross-section formed in the two predetermined dimensions when the central region of the icon is selected by the selecting means.

In the second aspect of the present invention, the information displaying device includes defining means for defining in advance the two predetermined dimensions corresponding to the peripheral region of the icon and the third dimension corresponding to the central region of the icon, out of n dimensions which describe the data.

In the third aspect of the present invention, the information displaying device includes designating means for designating a change of the displayed region in one of the positive direction and the negative direction in the third dimension other than the two predetermined dimensions when the central region of the icon is selected by the selecting means, the control means changing the displayed region in a direction designated by the designating means when the central region of the icon is selected by the selecting means.

In the information displaying device of the fourth aspect, when the central region of the icon is selected by the selecting means and a change of the displayed region in one of the positive direction or the negative direction in the third dimension other than the two predetermined dimensions is designated by the designating means, the display means displays, in the central region, an arrow expressing whether the designated direction is positive or negative.

In the fifth aspect of the present invention, there is provided an information displaying device including: storing means for storing n-dimensional information, n being an integer greater than or equal to two; display means for displaying an icon which is provided with a central region and a peripheral region surrounding the central region, and for displaying information, among the n-dimensional information stored in the storing means, corresponding to a given displayed region within one of a two-dimensional cross-section formed in two predetermined dimensions, and for displaying a cursor; selecting means for positioning the cursor at a desired area of the icon and for selecting the desired area; and control means for controlling the display means so that the displayed region changes within one of the two-dimensional cross-section and the plane in a direction determined by the central region of the icon and the selected area at a speed corresponding to a distance between the central region and the selected area when an area included in the peripheral region of the icon is selected by the selecting means, and for controlling the display means so that one of a size and an orientation of the displayed region changes when the central region of the icon is selected by the selecting means.

In the information displaying device of the sixth aspect, the display means displays an icon in which a second peripheral region is disposed at a periphery of the peripheral region. When the second peripheral region is selected by the selecting means, the control means controls the display means so that the displayed region changes instantaneously to a predetermined reference position within the two-dimensional cross-section.

In the information displaying device of the seventh aspect, a relation between a speed of changing the displayed region and a distance from the central region of the icon to an area selected by the selecting means is determined in advance, and the control means controls the display means so that the displayed region changes at a speed determined by the distance and the relation when an area included in the peripheral region of the icon is selected by the selecting means.

In the information displaying device of the eighth aspect, the display means displays an icon having a circular central region and an annular peripheral region disposed concentrically with the central region at an outer periphery of the central region.

In the information displaying device of the ninth aspect, the display means displays, in the peripheral region of the icon, arrows which help a user to comprehend intuitively directions of change of the displayed region.

In the first aspect, the display means displays the cursor and the icon, which includes the central region and the peripheral region at the periphery of the central region. The display means displays information, among the n-dimensional information stored in the storing means, corresponding to a given displayed region within a two-dimensional cross-section formed in two predetermined dimensions (n is an integer greater than or equal to three). The icon may be, for example, the icon of the eighth aspect which has a circular central region and an annular peripheral region which is disposed concentrically with the central region at an outer periphery of the central region.

When an area in the peripheral region of the icon is selected by the selecting means, the control means controls the display means so that the displayed region changes within the two-dimensional cross-section in a direction determined by the central region of the icon and the selected area at a speed corresponding to a distance between the central region and the selected area. As in the seventh aspect, the relation between the speed of changing the displayed region and the distance from the central region of the icon to the area selected by the selecting means may be determined in advance, and the speed of changing the displayed region may be determined by the distance from the central region to the selected area and by the aforementioned relation.

Accordingly, when the cursor is moved to the interior of the peripheral region of the icon and a desired area within the peripheral region is selected, the displayed region is changed within the two-dimensional cross-section. The information, among the n-dimensional information, which is displayed by the display means and which corresponds to the displayed region within the two-dimensional cross-section formed by the predetermined two dimensions, is scrolled along the two-dimensional cross-section. For example, the information stored in the storing means may be three-dimensional information in which a third dimension corresponding to time is added to two dimensions corresponding to a plane. In a case in which the two predetermined dimensions are two dimensions corresponding to the plane, when the peripheral region of the icon is selected, information corresponding to a plane (a two-dimensional cross-section) of a certain time is scrolled and successively displayed.

Further, the scrolling direction and scrolling speed at this time correspond to the relative positions of the central region of the icon and the selected area and to the distance between the central region and the selected area. When another area within the peripheral region is selected, at least one of the scrolling direction and the scrolling speed are varied in accordance with the position of the selected area. If a certain number of arrows are displayed in the peripheral region of the icon as in the ninth aspect, when an area within the peripheral region is selected and the displayed region is to be changed in a desired direction, the position of the area corresponding to the desired direction can be easily determined.

When the central region of the icon is selected by the selecting means, the control means controls the display means so that the displayed region changes in a direction of a third dimension other than the two predetermined dimensions and is positioned within another two-dimensional cross-section. By changing the displayed region in a direction of the third dimension other than the two predetermined dimensions, the information displayed by the display means is switched along the direction of the third dimension. For example, as described above, the information stored in the storing means is three-dimensional information in which a third dimension corresponding to time is added to two dimensions corresponding to a plane. In a case in which the two predetermined dimensions are the two dimensions corresponding to the plane, when the central region of the icon is selected, the information displayed by the display means is successively switched in a direction of the dimension corresponding to time, i.e., in either the past direction or the future direction.

In accordance with the position of the desired area which is within the icon and which is selected by the selecting means (i.e., in accordance with whether the desired area is in the peripheral region or the central region), the displayed region is either changed within the two-dimensional cross-section formed by the two predetermined dimensions or is changed in a direction of a third dimension other than the two predetermined dimensions. Further, when the peripheral region is selected, the direction of change and the speed of changing the displayed region within the two-dimensional cross-section vary in accordance with the position of the selected area within the peripheral region. This switching of the display can be realized completely by moving the cursor within the icon and selecting the desired area. Therefore, the amount of change when the cursor is moved to the desired area is small. The movements of scrolling, switching and the like of the portion which is displayed when multidimensional information of three or more dimensions is displayed can be effected smoothly, thereby improving work efficiency.

Further, in accordance with the second aspect, defining means may be included for defining in advance the two predetermined dimensions corresponding to the peripheral region of the icon and the third dimension corresponding to the central region of the icon. For example, when the information stored in the storing means is three-dimensional data representing a cube, the orientation of the two-dimensional cross-section can be defined arbitrarily along two dimensions. Therefore, variation can be added to the method of displaying the n-dimensional information, and a display corresponding to the contents of the n-dimensional information stored in the storing means can be displayed.

In accordance with the third aspect, a designating means may be provided for designating change of the displayed region in one of a positive direction and a negative direction in directions of the third dimension other than the two predetermined dimensions when the central region of the icon is selected by the selecting means. The control means changes the displayed region in a direction designated by the designating means when the central region of the icon is selected by the selecting means. For example, when the dimension is a dimension corresponding to time, it is possible to designate whether the displayed region is to be changed in the future direction or in the past direction.

In accordance with the fourth aspect, when arrows, which show whether the direction designated by the designating means is the positive direction or the negative direction, are displayed, it is easy to distinguish whether the direction which is presently designated is the positive direction or the negative direction.

In the present invention as described above, the displayed region is changed in directions of three predetermined dimensions. The present invention is applicable to cases in which the n-dimensional information stored in the storing means is multidimensional information of three or more dimensions. However, the present invention is not limited to cases in which the icon, which is displayed by the display means, displays multidimensional information of three or more dimensions. The present invention is also applicable to cases in which two-dimensional information is displayed.

As a result, in the fifth aspect of the present invention, the display means displays a cursor and an icon, which is provided with a central region and a peripheral region surrounding the central region. The display means also displays information, among the n-dimensional information stored in the storing means (n is an integer greater than or equal to two), corresponding to a given displayed region within a two-dimensional cross-section formed in two predetermined dimensions (when the information is three or more dimensions) or within a plane (when the information is two dimensions). When an area included in the peripheral region of the icon is selected by the selecting means, the control means effects control in the same way as in the first aspect of the present invention. When the central region of the icon is selected by the selecting means, the control means controls the display means so that one of the size and the orientation of the displayed region changes.

When the size of the displayed region is changed as mentioned above, the information displayed by the display means is either enlarged or reduced. When the orientation of the displayed region is changed, the information displayed by the display means is rotated or the like. The switching of the designation for changing the size and the orientation of the displayed region and the switching of the designation of the change of the displayed region can be realized by moving the cursor within the icon and selecting a desired area. Therefore, the amount of change when the cursor is moved to the desired area is small. The changing of the displayed portion (scrolling) and the enlargement, reduction, and rotation of the displayed portion when multidimensional information of two or more dimensions is displayed can be effected smoothly, and work efficiency can be improved.

In accordance with the sixth aspect, the display means displays an icon in which the second peripheral region is disposed at a periphery of the peripheral region. The control means controls the display means so that the displayed region changes instantaneously to a predetermined reference position within the two-dimensional cross-section or the plane when the second peripheral region is selected by the selecting means. The reference position may be, for example, an edge portion or a vicinity of an edge portion of the two-dimensional cross-section or the plane. Accordingly, the displayed region can be changed instantaneously to the reference position, and work efficiency can be improved.

In accordance with the first aspect of the present invention, the display means displays the icon which is provided with the central region and the peripheral region surrounding the central region, and displays information among n-dimensional information (n is an integer greater than or equal to three) stored in the storing means, corresponding to a given displayed region within the two-dimensional cross-section formed in two predetermined dimensions, and displays the cursor. When an area included in the peripheral region of the icon is selected, control is effected such that the displayed region changes within the two-dimensional cross-section in a direction determined by the central region of the icon and the selected area at a speed corresponding to a distance between the central region and the selected area. When the central region of the icon is selected, control is effected such that the displayed region changes in a direction of a third dimension other than the two predetermined dimensions and is positioned within another two-dimensional cross-section. Therefore, a superior effect is achieved in that the movements of scrolling, switching and the like of the portion which is displayed when multidimensional information of three or more dimensions is displayed can be effected smoothly.

In accordance with the fifth aspect of the present invention, the display means displays the icon which is provided with the central region and the peripheral region surrounding the central region, and displays information, among the n-dimensional information (n is an integer greater than or equal to two) stored in the storing means, corresponding to a given displayed region within a two-dimensional cross-section formed in two predetermined dimensions or within a plane, and displays the cursor. When an area included in the peripheral region of the icon is selected, control is effected so that the displayed region changes within the two-dimensional cross-section or the plane in a direction determined by the central region of the icon and the selected area at a speed corresponding to a distance between the central region and the selected area. When the central region of the icon is selected, control is effected so that one of a size and an orientation of the displayed region changes. Therefore, a superior effect is achieved in that changing, enlargement, reduction, and rotation of the portion which is displayed when multidimensional information of two or more dimensions is displayed can be effected smoothly.

BRIEF DESCRIPTION OF THE DRAWINGS

FIGS. 3A through 3D are conceptual views explaining a displayed region set on a two-dimensional cross-section of three-dimensional data and changing of the displayed region.

FIG. 9 is a line diagram illustrating the relation between, on the one hand, the distance between a center of the icon and an area indicated by a tip end portion of the cursor, and, on the other hand, the speed of changing the displayed region.

FIGS. 11A through 11D are image diagrams illustrating other examples of the icon.

DESCRIPTION OF THE PREFERRED EMBODIMENTS

Figure 1:
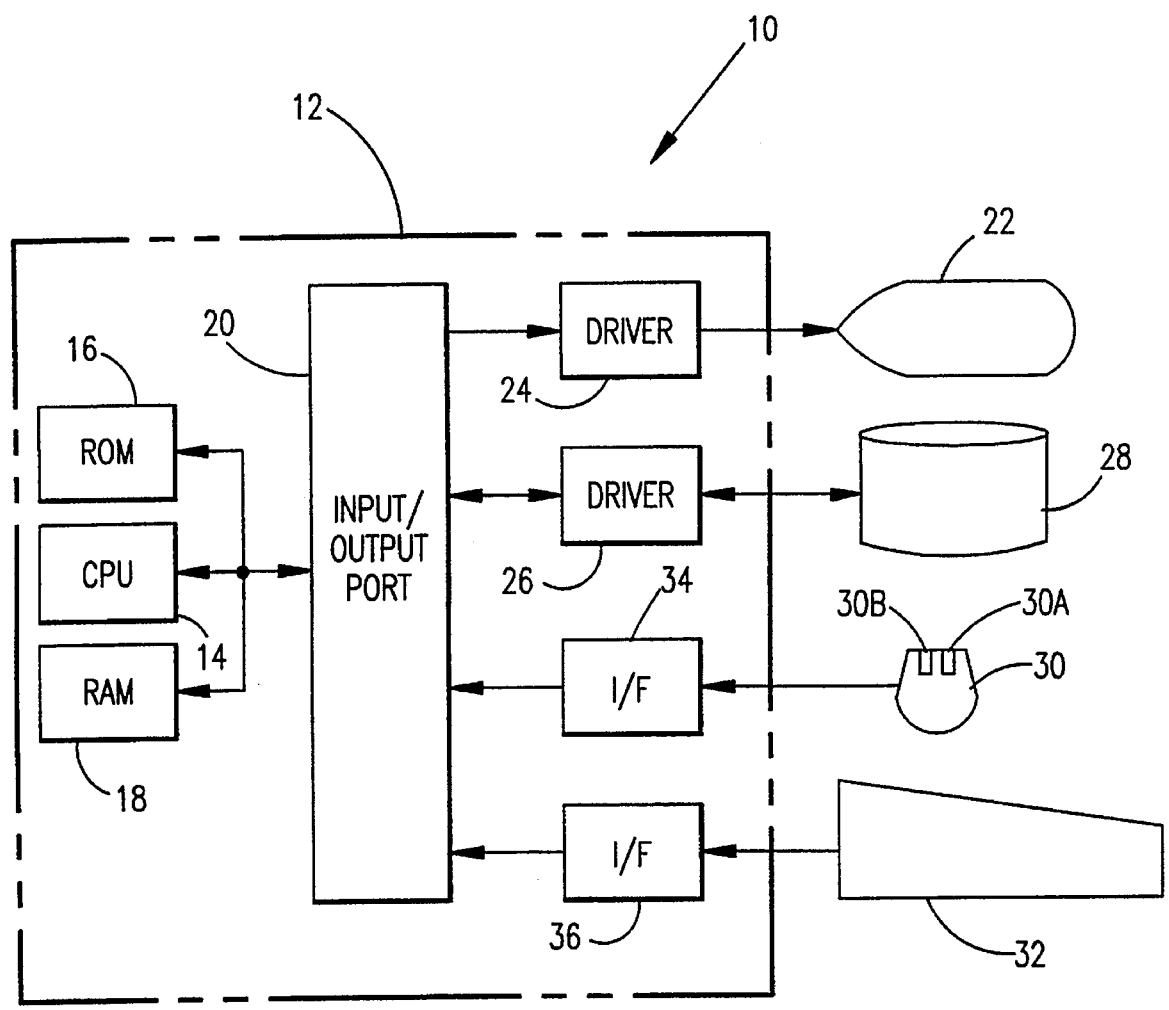
FIG. 1 is a block diagram illustrating a schematic structure of an information displaying device relating to a present embodiment.

An embodiment of the present invention will be described in detail with reference to the drawings. An information displaying device 10 relating to the present invention is illustrated in FIG. 1. The information displaying device 10 is formed by a work station 12 and by various input and/or output devices connected to an input/output port 20 of the work station 12. The work station 12 includes a CPU 14, a ROM 16, a RAM 18 and the input/output port 20 which are mutually connected through busses.

A display 22 for displaying information regarding an image or the like is connected to the input/output port 20 via a driver 24. An external storage device 28 is connected to the input/output port 20 via a driver 26. The external storage device 28 is equipped with a storing medium such as a magnetic disk, an optical disk or the like. Three-dimensional image data is stored on the storing medium. The following are examples of three-dimensional image data: dynamic image data which is based on the results of an aerodynamic characteristics test of a vehicle or the like and which represents variation over time of air flow which is projected and visualized on a two-dimensional plane (in this case, time is the third dimension); and cubic image data which is based on simulated results and which visualizes the regular flow of air within a clean room (in this case, the third dimension is height).

A mouse 30 equipped with a right button 30A and a left button 30B is connected to the input/output port 20 via an interface 34. An operator uses the mouse 30 to move a cursor displayed on the display 22 and to make various designations. A keyboard 32, which is used to make various designations and to input data and the like, is connected to the input/output port 20 via an interface 36. The program for operating the workstation 12 and each of the input and/or output devices as the information displaying device 10 is stored in the ROM 16. When the power is turned on, the program is read by each of the devices which form the information displaying device 10, and is implemented by the work station 12.

Figure 2:
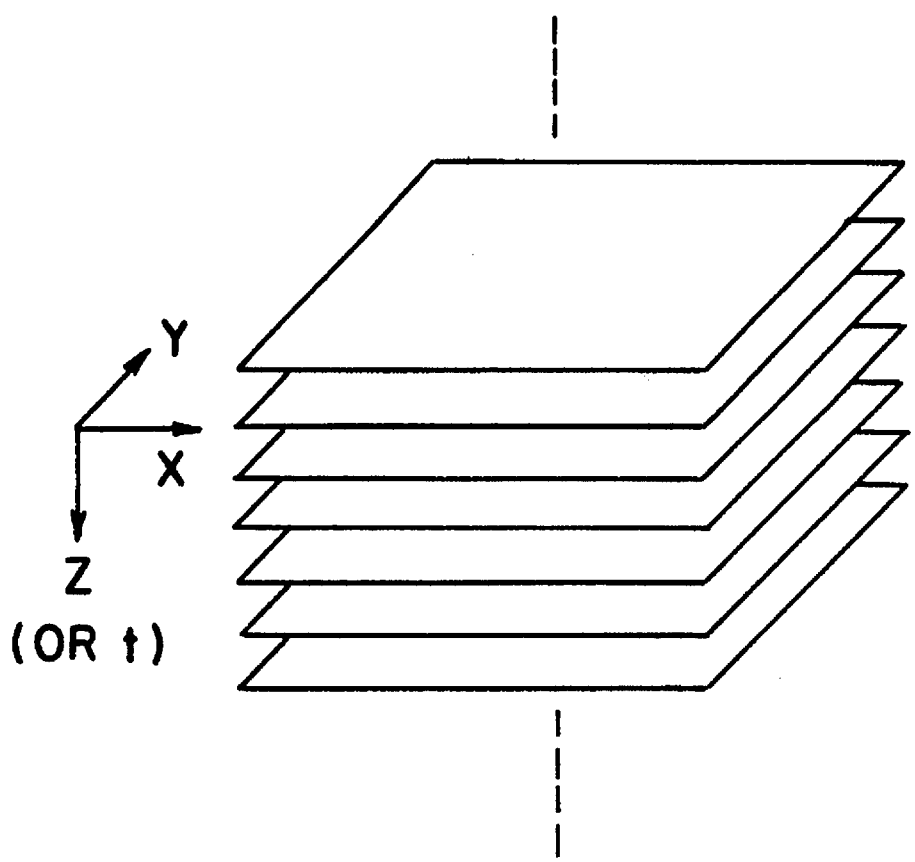
FIG. 2 is a conceptual view explaining a structure of three-dimensional data treated by the present embodiment.

Next, operation of the present embodiment will be described. As illustrated in FIG. 2, in the information displaying device 10 of the present invention, the three-dimensional data stored on the storing medium of the external storage device 28 is treated as structural data in which two-dimensional data, which respectively represent a planar image along the X and Y axes which are perpendicular to each other, are accumulated along the Z-axis (third dimension) which is orthogonal to the X-axis and the Y-axis. Hereinafter, each plane which forms the three-dimensional data will be referred to as a two-dimensional cross-section of the three-dimensional data. When the three-dimensional data is displayed on the display 22, a displayed region 40 (see FIG. 3A) is set on a predetermined two-dimensional cross-section, and an image corresponding to this displayed region 40 is displayed on the display 22.

The position of the displayed region 40 is represented by the first parameter, which represents the position of the displayed region 40 on the two-dimensional cross-section along the X-axis direction, by the second parameter, which represents the position of the displayed region 40 on the two-dimensional cross-section along the Y-axis direction, and by the third parameter, which represents the position of the displayed region 40 along the Z-axis direction (the position of the two-dimensional cross-section at which the displayed region 40 is positioned).

In the present embodiment, the correspondence of the respective dimensions of the three dimensions to the X-axis, the Y-axis, and the Z-axis illustrated in FIG. 2 is determined in advance. For example, in the case of the aforementioned dynamic image data, the X-axis direction and the Y-axis direction correspond to the two-dimensional plane. In this case, the two-dimensional cross-section corresponds to the planar image representing the flow of air at a certain time. As another example, in the case of the cubic image data described above, the X-axis direction and the Y-axis direction may correspond to the (two-dimensional) floor of the clean room. The two-dimensional cross-section in this case corresponds to a planar image representing the regular flow of air along a direction parallel to the floor at a certain height.

When the image is displayed on the display 22, a command set in advance at the information displaying device 10 is implemented. The first through the third parameters are set in the command as arguments. On the command implementing side, image data corresponding to the displayed region 40 is determined on the basis of the position of the displayed region 40 along the X, Y and Z axes which is expressed by the first through the third parameters which are delivered as arguments. The image data is transmitted from the storing medium to the driver 24 of the display 22. Accordingly, the image corresponding to the displayed region 40 is displayed on the display 22.

Movement of the position of the displayed region 40 is effected by the designation of the operator using an icon, as will be described hereinafter. The command is implemented with the first through the third parameters, whose values are changed in accordance with the designation, as arguments. The image displayed on the display 22 thereby scrolls or switches.

Figure 4:
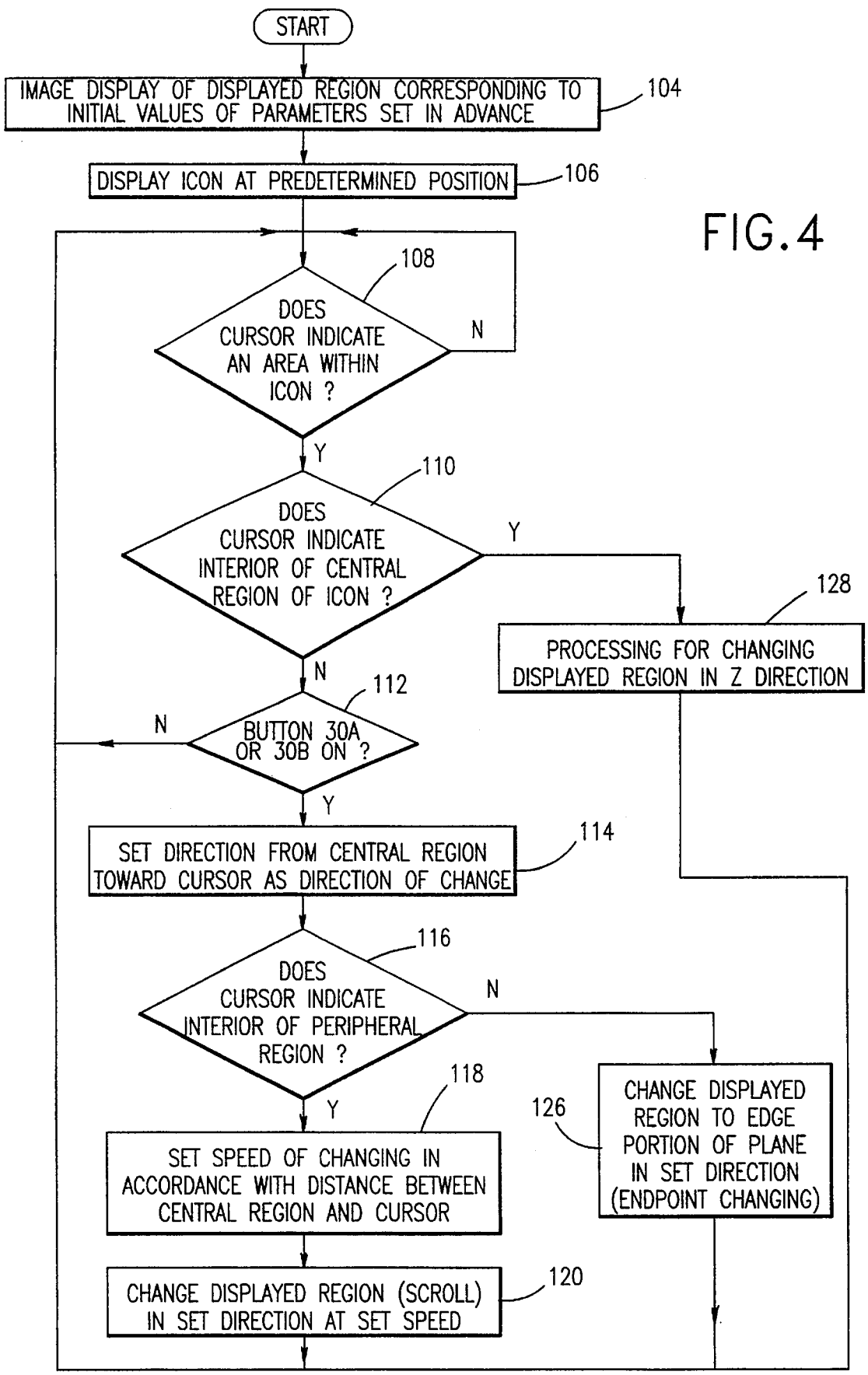
FIG. 4 is a flowchart summarizing processing at the information displaying device.
Figure 6:
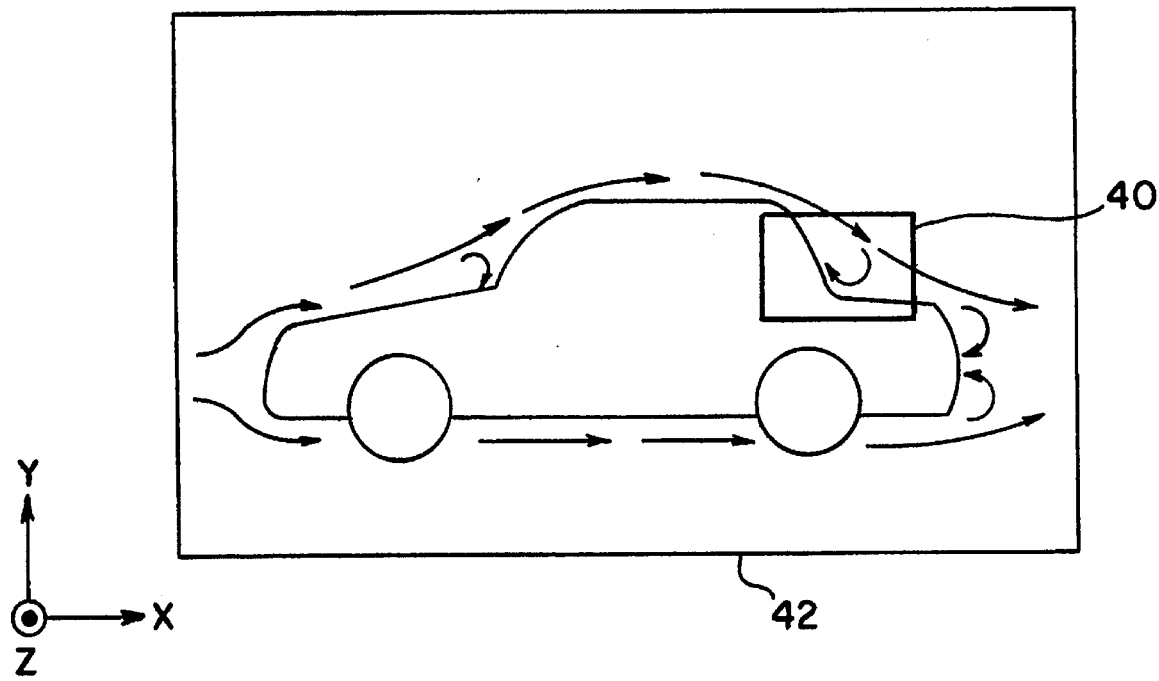
FIG. 6 is a conceptual view illustrating the display region positioned at a predetermined position on a planar image corresponding to the two-dimensional cross-section.
Figure 7:
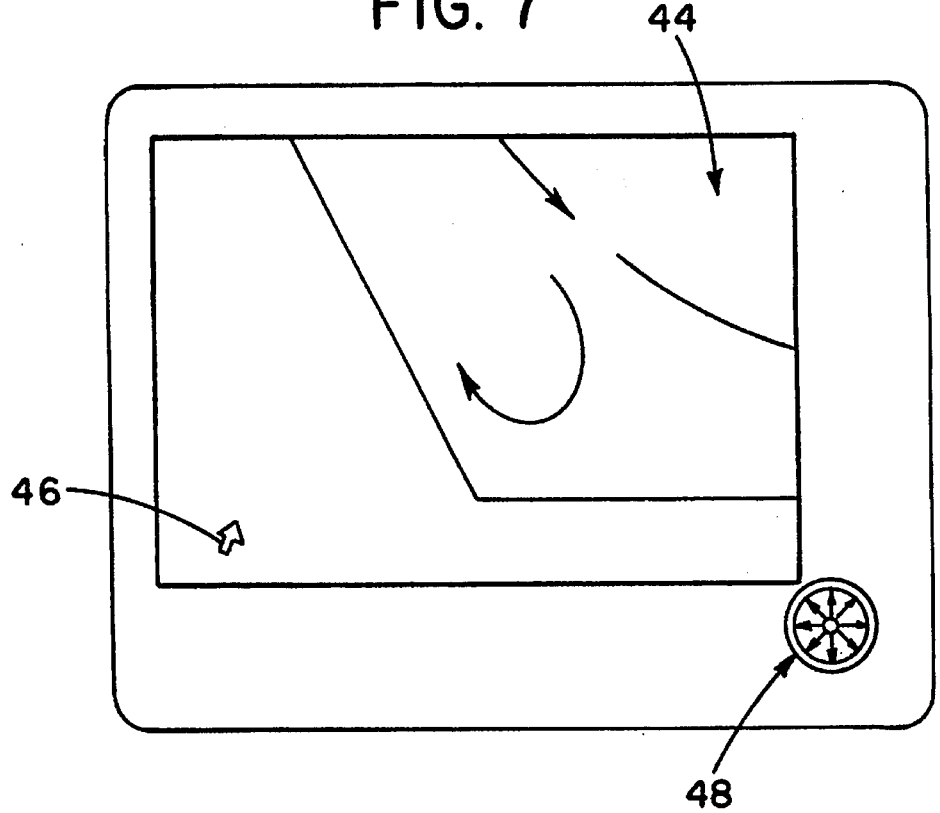
FIG. 7 is an image diagram illustrating an image, a cursor, and an icon which are displayed on a display when the displayed region is at the position illustrated in FIG. 6.

Image display processing at the work station 12 will now be described with reference to the flowchart in FIG. 4. In step 104, initial values of the respective first through third parameters, which represent the initial position of the displayed region 40, are fetched. A command is executed with the fetched initial values of the respective parameters as arguments, and the image corresponding to the displayed region 40 positioned at the initial position is displayed in a window region provided on the display surface of the display 22. For example, when the initial position of the displayed region 40 corresponding to the initial values of the first through the third parameters is the position illustrated in FIG. 6 on a planar image 42 (which corresponds to the two-dimensional cross-section), the image data corresponding to this image region 40 is transferred to the driver 34. As illustrated in FIG. 7, the image corresponding to the displayed region 40 is displayed within a window region 44 of the display 22.

Figure 8A:
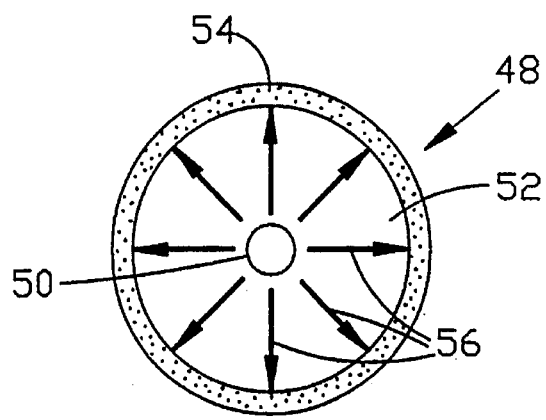
FIGS. 8A through 8F are image diagrams illustrating an icon relating to the present embodiment and the cursor which is moved to a position indicating the icon.

In subsequent step 106, a cursor 46 is displayed in the window region 44 as illustrated in FIG. 7, and an icon 48 is displayed at a predetermined position outside of the window region 44. As is commonly known, the cursor 46 is moved on the screen of the display 22 in accordance with the operation of the mouse 30 by the operator. Further, as illustrated in FIG. 8A, the icon 48 is formed by a circular central region 50, which is disposed in a central portion, a doughnut-shaped region 52, which is disposed at the outer periphery of the central region 50, and an outer shell 54, which is annular and is disposed at the outer periphery of the doughnut-shaped region 52. A plurality of arrows 56, which are disposed radially around the central region 50, are displayed within the doughnut-shaped region 52 in order to help users to comprehend intuitively the directions of change.

When the operator refers to the image displayed on the display 22 and wishes to display another portion within the two-dimensional cross-section, i.e., when the operator wishes to change the displayed region 40 within the two-dimensional cross-section (see FIG. 3B), the operator makes a designation by operating the mouse 30 to move the cursor 46 so that the tip end portion of the cursor 46 indicates a region which is within the doughnut-shaped region 52 of the icon 48 and which corresponds to the direction of change of the displayed region 40. The operator turns on button 30A or button 30B of the mouse 30. Further, when the operator wishes to display an image within another two-dimensional cross-section, i.e., when the operator wishes to change the displayed region 40 along the Z-axis (see FIG. 3D), the operator makes a designation by operating the mouse 30 to move the cursor 46 so that the tip end portion of the cursor 46 indicates the central region 50 of the icon 48. The operator turns on the right button 30A or the left button 30B in accordance with the desired direction of change.

Figure 8B:
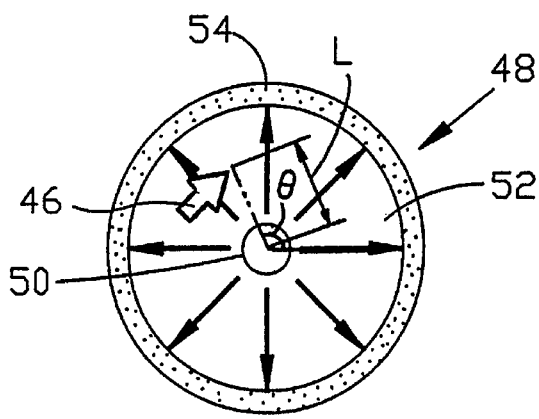
Figure 8C:
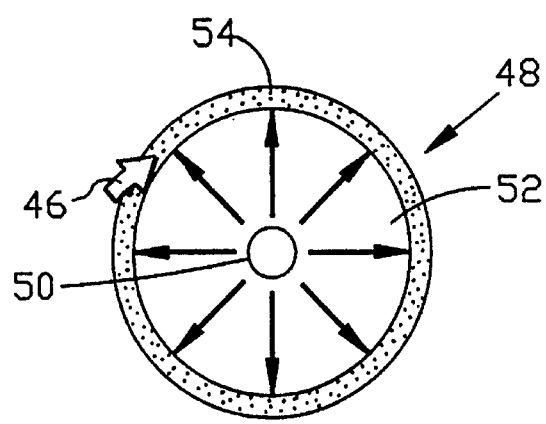
Figure 8D:
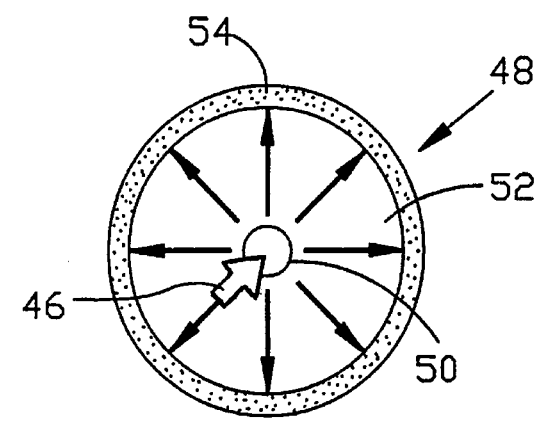

In step 108, a determination is made as to whether the tip end portion of the cursor 46 is indicating an area within the icon 48. If the answer to the determination in step 108 is "Yes", the process proceeds to step 110 where a determination is made as to whether the tip end portion of the cursor 46 is indicating the interior of the central region 50 of the icon 48, as illustrated in FIG. 8D. When the answer to the determination in step 110 is "No", the tip end portion of the cursor 46 either indicates the doughnut-shaped region 52 of the icon 48 as shown in FIG. 8B or indicates the outer shell 54 of the icon 48 as shown in FIG. 8C. When the answer to the determination in step 110 is "No", in step 112, a determination is made as to whether the button 30A or the button 30B of the mouse 30 is on. When the answer to the determination in step 112 is "No", the process returns to step 108 without the displayed region 40 being changed.

When a determination is made in step 112 that the button 30A or the button 30B is on, the process proceeds to step 114 where an angle &H (see FIG. 8B), which represents a direction from the center of the icon 48 to the area which the tip end portion of the cursor 48 indicates, is determined, and that direction is set as the direction of change of the displayed region 40. In step 116, a determination is made as to whether the tip end portion of the cursor 46 indicates the doughnut-shaped region 52. When the answer to the determination in step 116 is "Yes", the process proceeds to step 118 where a distance L (see FIG. 8B) from the central region 50 to the area indicated by the tip end portion of the cursor 46 is determined. For example, a speed of changing which corresponds to the magnitude of the determined distance L is set as the speed of changing the displayed region 40 based on the relation, which is set in advance as shown by the straight line 58 in FIG. 9, between the distance L and the speed of changing.

The relation between the distance L and the speed of changing is not limited to the linear relation represented by the straight line 58. For example, as shown in FIG. 9, the speed of changing the displayed region 40 may be determined on the basis of a curve 60 illustrated by the broken line, or a curve 62 illustrated by the two-dot chain line or the like.

In step 120, the values of the first parameter and the second parameter are changed so that the position of the displayed region 40 changes on the two-dimensional cross-section in the direction of change, which was set as described, above and only by a step width corresponding to the speed of changing, which was set as described above. (However, when the angle &H is 0° or 180°, only the first parameter is changed, and when &H is 90° or 270°, only the second parameter is changed). The command is executed with the respective parameters, including the changed parameters, as arguments. Accordingly, the image corresponding to the changed displayed region 40 is displayed on the display 22.

When the process in step 120 is carried out, the process returns once to step 108. However, when the tip end portion of the cursor 46 indicates an area within the doughnut-shaped region 52 of the icon 48 and the button 30A or the button 30B of the mouse 30 is on, the process of step 120 is repeated. Accordingly, each time the process of step 120 is executed, the displayed region 40 changes by the step width in the direction of change, and the image displayed on the display 22 is scrolled on the two-dimensional cross-section at a speed of changing corresponding to the step width and in the aforementioned direction of change.

When the position indicated by the tip end portion of the cursor 46 moves within the doughnut-shaped region 52 while the process in step 120 is being repeatedly executed, in steps 114 and 118, at least one of the direction of change and the speed of changing is changed in accordance with the changed position. Accordingly, it is possible to change the direction and the speed of the scroll while the image is scrolling.

When it is desired to scroll the displayed imaged in a predetermined direction on the two-dimensional cross-section, the operator may move the tip end portion of the cursor 46 to a position indicating an area within the doughnut-shaped region 52 of the icon 48 which corresponds to the desired direction, and turn on the button 30A or the button 30B. The displayed image can thereby be scrolled in an arbitrary direction. Further, when an image to be displayed and the currently displayed image are distanced from each other on the two-dimensional cross-section, if the cursor 46 is moved so that the tip end portion thereof indicates a position distanced from the center of the icon 48, the scrolling speed increases. When an image to be displayed and the currently displayed image are close to each other on the two-dimensional cross-section, if the cursor 46 is moved so that the tip end portion thereof indicates a position which is close to the center of the icon 48, the scrolling speed decreases. Therefore, the displayed image can be scrolled at an arbitrary speed.

In the determination in step 116, if the tip end portion of the cursor 46 indicates the outer shell 54 of the icon 48 as illustrated in FIG. 8C, the answer to the determination in step 116 is "No", and the process proceeds to step 126. In step 126, the first parameter and the second parameter are changed so that the displayed region 40 changes on the two-dimensional cross-section in the direction of change, which was set as described above, to an edge portion of the two-dimensional cross-section. The command is executed with the respective parameters, including the changed parameters, as arguments. Accordingly, the image displayed on the display 22 is instantaneously switched to an image corresponding to the changed displayed region 40.

Accordingly, when it is desired to display an image of an edge portion in a predetermined direction on the two-dimensional cross-section, the operator may move the tip end portion of the cursor 46 to a position indicating an area within the outer shell 54 which corresponds to the predetermined direction, and turn on the button 30A or the button 30B. Accordingly, when the image of the edge portion on the two-dimensional cross-section is displayed, there is no need to continuously scroll until the image is displayed. Because operation is facilitated and the time the operator must wait during scrolling is eliminated, work efficiency improves.

Figure 5:
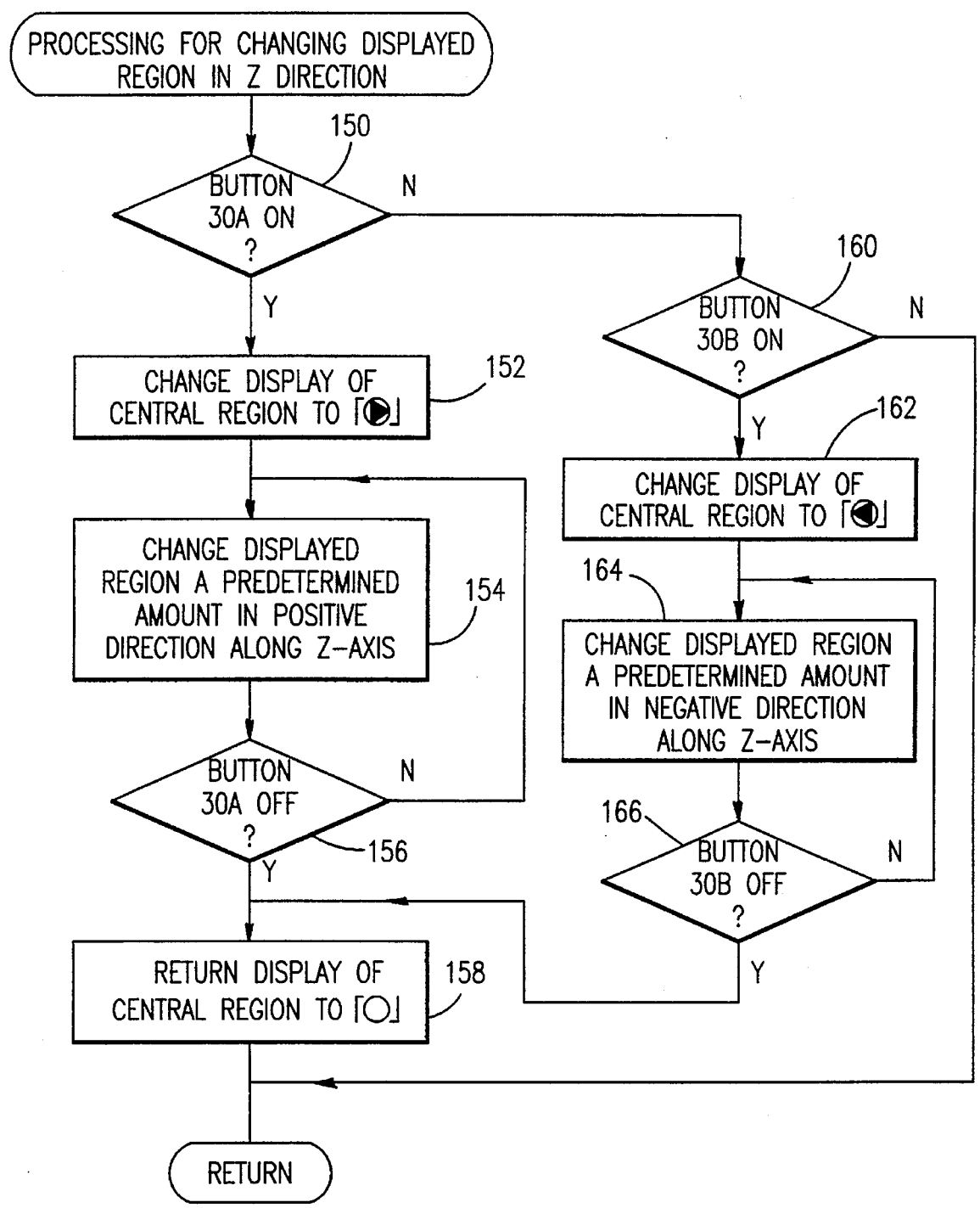
FIG. 5 is a flowchart explaining processing for changing the displayed region in the Z direction.
Figure 8E:
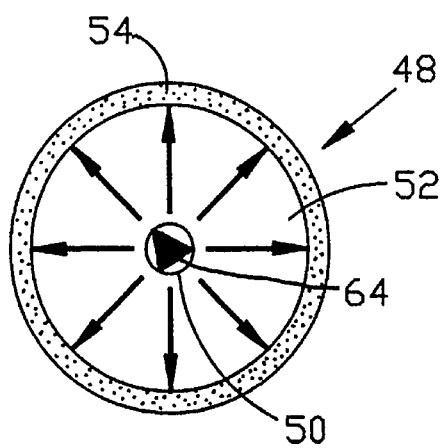

Further, in step 110, when the tip end portion of the cursor 46 indicates an area within the central region 50 of the icon 48 as shown in FIG. 8D, the process proceeds to step 128 where processing for changing the displayed region 40 in the Z direction is effected. Details of processing for changing the displayed region 40 in the Z direction will now be described with reference to the flowchart in FIG. 5. In step 150, a determination is made as to whether the right button 30A of the mouse 30 is on. The right button 30A is turned on by the operator when the displayed region 40 is to be changed in the positive direction along the Z-axis (the direction shown by arrow A in FIG. 3D, i.e., the direction in which the value of the third parameter increases). When the answer to the determination in step 150 is "Yes", in step 152, the display of the central region 50 of the icon 48 is changed to an arrow 64, which faces toward the right, as shown in FIG. 8E.

In subsequent step 154, the value of the third parameter is increased so that the position of the displayed region 40 changes a predetermined amount in the positive direction along the Z-axis and is positioned on another two-dimensional cross-section. The command is executed with the respective parameters, including the third parameter whose value is increased, as arguments. Accordingly, the image corresponding to the displayed region 40, which is changed the predetermined amount, is displayed on the display 22. In step 156, a determination is made as to whether the button 30A is off. The process in step 154 is repeatedly executed while the answer to the determination in step 156 is "No".

Accordingly, while the right button 30A of the mouse 30 is on, the displayed image of the display 22 changes successively in the positive direction along the Z-axis. When, for example, the three-dimensional data is dynamic image data which is based on the results of an aerodynamic characteristics test of a vehicle or the like and which illustrates variation over time of air flow which is projected and visualized on a two-dimensional surface so as to be visible, the image of a given area on the two-dimensional plane successively changes in the positive direction of time (the future direction). The variations in air flow over time at the area are successively displayed. Further, when the three-dimensional data is cubic image data which is based on simulated results and which visualizes the regular flow of air within a clean room, the planar image, which expresses the regular flow of air along a direction parallel to the floor at a predetermined height, successively changes in the direction in which the height position increases (the rising direction). The regular flow of air is thereby displayed at each height position.

When the right button 30A of the mouse 30 is turned off, the answer to the determination in step 156 is "Yes", and the changing of the displayed region 40 is stopped. In step 158, the display of the central region 50 of the icon 48 is returned to its blank state (see FIG. 8A), and processing for changing the displayed region 40 in the Z direction is completed.

Figure 8F:
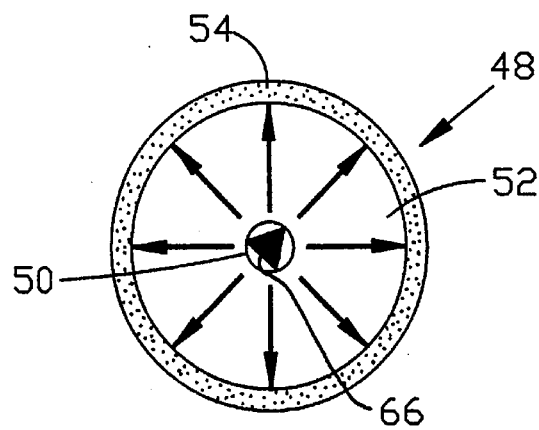

When the answer to the determination in step 150 is "No", the process proceeds to step 160 where a determination is made as to whether the left button 30B is on. The left button 30B is turned on by the operator when the displayed region 40 is to be changed in the negative direction along the Z-axis (the direction shown by arrow B in FIG. 3D, i.e., the direction in which the value of the third parameter decreases). When the answer to the determination in step 160 is "Yes", in step 162, the display of the central region 50 of the icon 48 is changed to an arrow 66, which faces toward the left, as shown in FIG. 8F.

In step 164, the value of the third parameter is decreased so that the position of the displayed region 40 changes a predetermined amount in the negative direction along the Z-axis and is positioned on another two-dimensional cross-section. The command is executed with the respective parameters, including the third parameter whose value is decreased, as arguments. Accordingly, the image corresponding to the displayed region 40, which is changed the predetermined amount, is displayed on the display 22. In step 166, a determination is made as to whether the button 30B is off. The process in step 164 is repeatedly executed until the answer to the determination in step 166 becomes "Yes".

Accordingly, while the left button 30B of the mouse 30 is on, the displayed image of the display 22 successively changes in the negative direction along the Z-axis. When, for example, the three-dimensional data is dynamic image data based on results of the aerodynamic characteristics test described above, an image of a given area on the two-dimensional plane successively changes in the retrogressive direction of time (the past direction). The past variations in air flow at the area are successively displayed.

When the left button 30B of the mask 30 is turned off, the answer to the determination in step 166 is "Yes", and the changing of the displayed region 40 is stopped. In the same way as described above, in step 158, the display of the central region 50 of the icon 48 is returned to its blank state, and the process is completed. Further, when the present routine is executed, if neither the right button 30A nor the left button 30B is on, processing for changing the displayed region 40 in the Z direction is completed without any processes being carried out, and the process returns to the main routine illustrated in FIG. 4.

When it is desired to change the displayed region 40 in the direction along the Z-axis and display an image corresponding to another two-dimensional cross-section, the operator may move the tip end portion of the cursor 46 to a position indicating the interior of the central region 50 of the icon 48, and turn on button 30A or button 30B. Accordingly, the respective operations of scrolling the displayed image, switching to an image corresponding to an edge portion of the two-dimensional cross-section, and changing to an image corresponding to another two-dimensional cross-section can all be carried out by making the tip end portion of the cursor 46 correspond to the respective regions within the icon 48 and turning button 30A or button 30B on. Therefore, when an operation is carried out and subsequently another operation is to be effected, there is no need to move the cursor 46 out of the icon 48, and the amount of movement of the cursor 46 is extremely small. Accordingly, work efficiency improves.

Figure 10A:
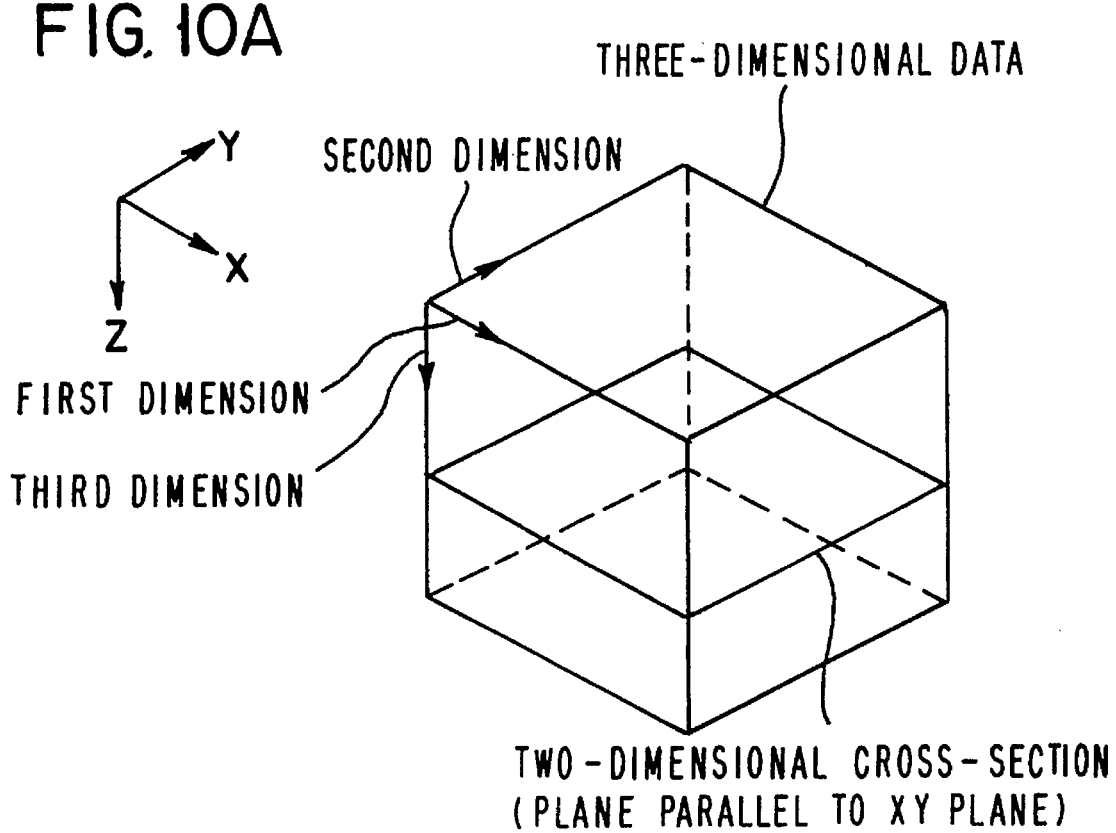
FIGS. 10A and 10B are conceptual views explaining cases in which the orientation of the two-dimensional cross-section is changed with respect to three-dimensional data.
Figure 10B:
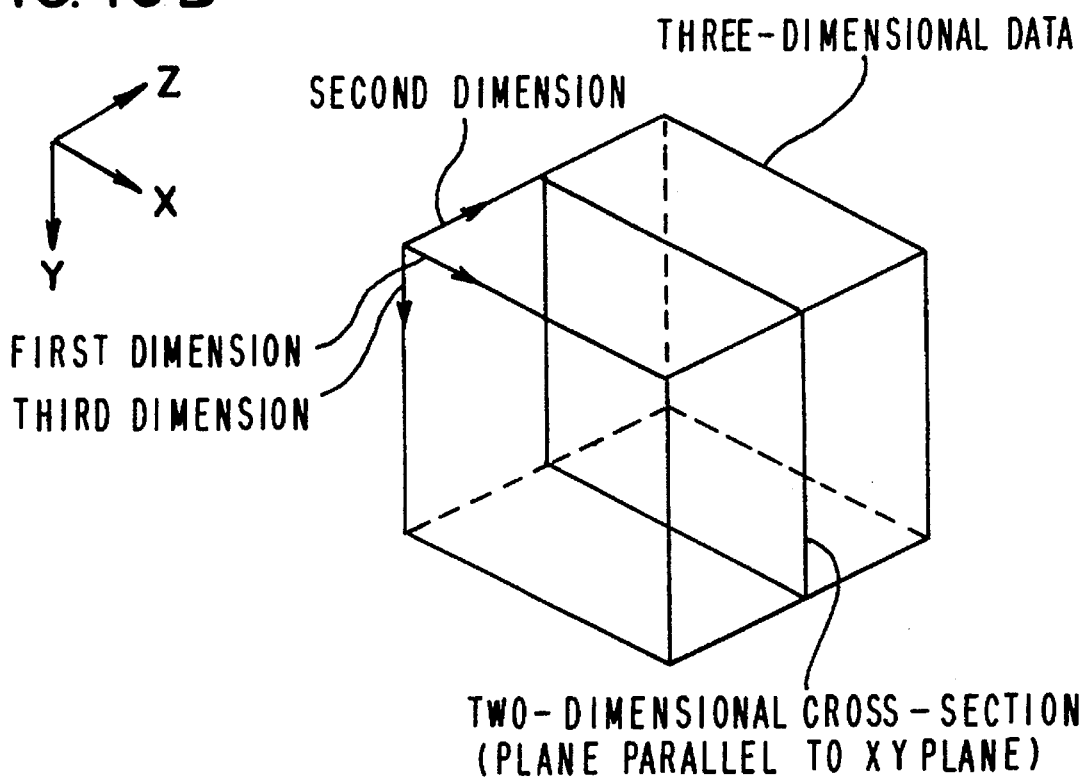

In the above description, the correspondence of the respective dimensions of the three dimensions to the X-axis, the Y-axis, and the Z-axis illustrated in FIG. 2 is determined in advance. However, the present invention is not limited to the same. Before display processing of the image is effected, a screen for allowing the operator to define which of the X-axis direction, Y-axis direction and Z-axis direction correspond to which of the dimensions of the three-dimensional data may be displayed, and the orientation of the two-dimensional cross-section may be changed. For example, as illustrated in FIG. 10A, the X-axis direction is made to correspond to the first dimension of three-dimensional data which represents a cube as a model, the Y-axis direction is made to correspond to the second dimension, and the Z-axis direction is made to correspond to the third dimension. In this case, the two-dimensional cross-section is a plane which is parallel to the XY plane, and which is therefore a plane formed by the first dimension and the second dimension. However, if the X-axis direction is made to correspond to the first dimension, the Y-axis direction is made to correspond to the third dimension, and the Z-axis direction is made to correspond to the second dimension, the two-dimensional cross-section is a plane formed by the first dimension and the third dimension.

This changing of the orientation of the two-dimensional cross-section is particularly effective when, for example, the three-dimensional data is cubic image data which is based on simulated results and which visualizes the regular flow of air within a clean room. When, as described in the above embodiment, the X-axis direction and the Y-axis direction are made to correspond to the (two-dimensional) floor of the clean room, the two-dimensional cross-section is a plane which is parallel to the floor, and an image representing the flow of air along a direction parallel to the floor at a height position is displayed on the display 22. However, when the X-axis direction and the Y-axis direction are made to correspond to a (two-dimensional) wall of the clean room, the two-dimensional cross section is a plane which is parallel to the wall. Therefore, an image which represents the flow of air along a direction perpendicular to the floor is displayed on the display 22.

Three-dimensional data is used in the examples described above. However, the present invention may also be applied to multidimensional data of four or more dimensions. The aforementioned changing of the orientation of the two-dimensional cross-section is effective for multidimensional data as well. For example, time may be added as a fourth dimension to the cubic image data (three-dimensional data) which visualizes the flow of air within a clean room. By changing the orientation of the two-dimensional cross-section of the four-dimensional data which represents the changes of the air flow within a cube over the passage of time, the variations over time of the flow of air within a certain two-dimensional cross-section can be displayed, or the variation, along a direction perpendicular to the floor, of the flow of air at each area on the floor at a certain time can be displayed.

When the tip end portion of the cursor 46 designates the central region 50 of the icon 48, if the right button 30A of the mouse 30 is turned on, the arrow 64 which points to the right is displayed in the central region 50, and if the left button 30B is turned on, the arrow 66 which points to the left is displayed in the central region 50. The displayed region 40 is thereby changed in the positive direction or the negative direction along the Z-axis. However, the present invention is not limited to the same. For example, as illustrated in FIG. 11A, the central region 50 may be divided into a first region 50A and a second region 50B, and the arrow 64 and the arrow 66 may be displayed respectively therein in advance. The displayed region 40 is changed in different directions (the positive direction or the negative direction along the Z-axis) when the first region 50A is selected and when the second region 50B is selected.

Further, the icon of the present invention is not limited to the icon 48 illustrated in FIG. 8A in which the central region 50 is circular and the doughnut-shaped region 52 and the outer shell 54 are annular. As shown by the examples in FIGS. 11B through 11D, each of the regions can be formed in a variety of configurations.

Figure 12A:
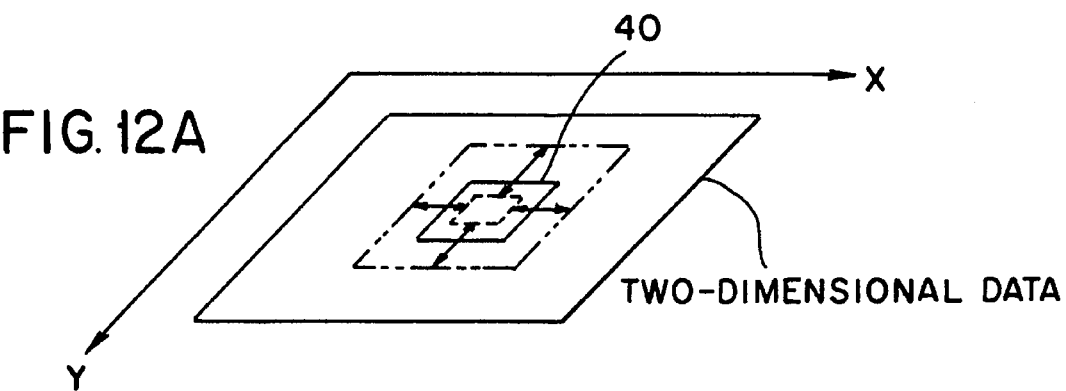
FIGS. 12A and 12B are conceptual views explaining processing when the present invention is applied to two-dimensional data.

In the above description, when the central region 50 of the icon 48 is selected, the displayed region 40 is changed along the Z-axis. However, the present invention is not limited to the same. As shown as an example in FIG. 12A, the displayed region 40 is set on two-dimensional data represented by a plane as a model. When the doughnut-shaped region 52 or the outer shell 54 of the icon 48 are selected, the displayed region 40 is changed within the plane. When the central region 50 is selected, the size of the displayed region 40 may be increased, as shown by the two-dot chain line in FIG. 12A, and may be decreased, as shown by the broken line.

Figure 12B:
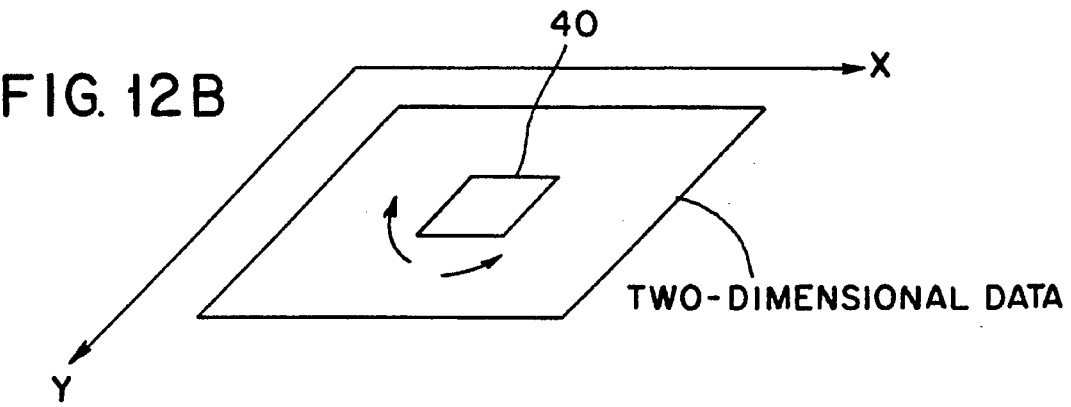

In a case in which the size of the window region 44 on the screen of the display 22 is fixed, when the size of the displayed region 40 is increased as described above, the displayed image is reduced. When the size of the displayed region 40 is decreased, the displayed image is enlarged. Further, as illustrated in FIG. 12B, when the central region 50 of the icon 48 is selected, the displayed region 40 may be rotated clockwise or counterclockwise. In this case, the displayed image of the display 22 is rotated. The operations of enlargement, reduction, rotation and the like can also be carried out for multidimensional data of three or more dimensions.

Although image data is used in the above explanation, the present invention is not limited to the same. For example, the present invention is applicable to various types of data such as text data and the like. The present invention is also applicable to cases in which, instead of the three-dimensional data described above, two-dimensional data of a plurality of mutually unrelated planar image data or the like are stored as three-dimensional data as shown in FIG. 2, and a targeted area of a targeted image is retrieved and displayed.

In the above description, when the outer shell 54 of the icon 48 is selected, the displayed region 40 is changed to the edge portion of the two-dimensional cross-section as a reference position. However, a reference position other than the edge portion may be determined in advance, and the displayed region 40 may be changed to this reference position.

Figure 13:
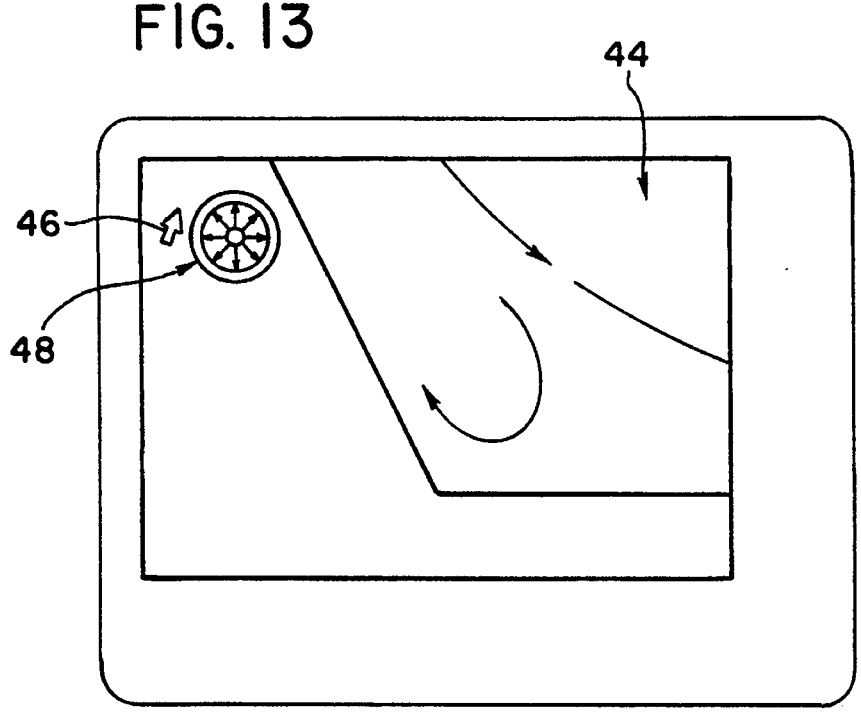
FIG. 13 is an image diagram illustrating another example of a display position of the icon.

Further, in the above description, the icon 48 is displayed at a position which is determined in advance. However, when a designation to display the icon 48 is input, the icon 48 may be displayed in a vicinity of the area where the cursor 46 was positioned when the designation was input (see FIG. 13), or the icon 48 may be superposed and displayed on the cursor 46. Moreover, the icon 48 which was once displayed may be moved in accordance with the designation of the operator.

What is claimed is:

1. An information displaying device comprising:

storing means for storing n-dimensional information, n being an integer greater than or equal to three;

display means for displaying an icon which is provided with a central region and a peripheral region surrounding said central region, and for displaying information, among the n-dimensional information stored in said storing means, corresponding to a given displayed region within a two-dimensional cross-section formed in two predetermined dimensions, and for displaying a cursor;

selecting means for positioning said cursor at a desired area of said icon and for selecting said desired area; and control means for controlling said display means so that said displayed region changes within said two-dimensional cross-section in a direction determined by said central region of said icon and said selected area at a speed corresponding to a distance between said central region and said selected area when an area included in said peripheral region of said icon is selected by said selecting means, and for controlling said display means so that said displayed region changes in a direction of a third dimension other than said two predetermined dimensions and is positioned within another two-dimensional cross-section formed in said two predetermined dimensions when said central region of said icon is selected by said selecting means.

2. An information displaying device according to claim 1, further comprising:

defining means for defining in advance said two predetermined dimensions corresponding to said peripheral region of said icon and said third dimension corresponding to said central region of said icon.

3. An information displaying device according to claim 2, further comprising:

designating means for designating a change of said displayed region in one of a positive direction and a negative direction in directions of said third dimension other than said two predetermined dimensions when said central region of said icon is selected by said selecting means, said control means changing said displayed region in a direction designated by said designating means when said central region of said icon is selected by said selecting means.

4. An information displaying device according to claim 3, wherein, when said central region of said icon is selected by said selecting means and a change of said displayed region in one of the positive direction and the negative direction in directions of said third dimension other than said two predetermined dimensions is designated by said designating means, said display means displays, in said central region, an arrow expressing that said designated direction is one of the positive direction and the negative direction.

5. An information displaying device comprising:

storing means for storing n-dimensional information, n being an integer greater than or equal to two;

display means for displaying an icon which is provided with a central region and a peripheral region surrounding said central region, and for displaying information, among the n-dimensional information stored in said storing means, corresponding to a given displayed region within one of a two-dimensional cross-section formed in two predetermined dimensions and a plane, and for displaying a cursor;

selecting means for positioning said cursor at a desired area of said icon and for selecting said desired area; and control means for controlling said display means so that said displayed region changes within one of said two-dimensional cross-section and said plane in a direction determined by said central region of said icon and said selected area at a speed corresponding to a distance between said central region and said selected area when an area included in said peripheral region of said icon is selected by said selecting means, and for controlling said display means so that an orientation of said displayed region changes when said central region of said icon is selected by said selecting means.

6. An information displaying device comprising:

storing means for storing n-dimensional information, n being an integer greater than or equal to two;

display means for displaying an icon which is provided with a central region and a first peripheral region surrounding said central region, and for displaying information, among the n-dimensional information stored in said storing means, corresponding to a given displayed region within one of a two-dimensional cross-section formed in two predetermined dimensions and a plane, and for displaying a cursor;

selecting means for positioning said cursor at a desired area of said icon and for selecting said desired area; and control means for controlling said display means so that said displayed region changes within one of said two-dimensional cross-section and said plane in a direction determined by said central region of said icon and said selected area at a speed corresponding to a distance between said central region and said selected area when an area included in said first peripheral region of said icon is selected by said selecting means, and for controlling said display means so that one of a size and an orientation of said displayed region changes when said central region of said icon is selected by said selecting means, said icon being further provided with a second peripheral region disposed at a periphery of said first peripheral region, and said control means controls said display means so that said displayed region changes instantaneously to a predetermined reference position within one of said two-dimensional cross-section and said plane when said second peripheral region is selected by said selecting means.

7. An information displaying device according to claim 6, wherein a relation between a speed of changing said displayed region and a distance from said central region of said icon to an area selected by said selecting means is determined in advance, and said control means controls said display means so that said displayed region changes at a speed determined by said distance and said relation when an area included in said first peripheral region of said icon is selected by said selecting means.

8. An information displaying device according to claim 7, wherein said central region of said icon is circular and said first peripheral region of said icon is annular and disposed concentrically with respect to said central region and at an outer periphery of said central region.

9. An information displaying region according to claim 8, wherein said display means displays, in said first peripheral region of said icon, arrows which represent typical directions of change of said displayed region.

10. An information displaying device comprising:

storing means for storing n-dimensional information, n being an integer greater than or equal to two;

display means for displaying an icon which is provided with a central region and a peripheral region surrounding said central region, and for displaying information, among the n-dimensional information stored in said storing means, corresponding to a given displayed region within one of a two-dimensional cross-section formed in two predetermined dimensions and a plane, and for displaying a cursor;

selecting means for positioning said cursor at a desired area of said icon and for selecting said desired area; and control means for controlling said display means so that said displayed region changes within one of said two-dimensional cross-section and said plane in a direction determined by said central region of said icon and said selected area at a speed corresponding to a distance between said central region and said selected area when an area included in said peripheral region of said icon is selected by said selecting means, and for controlling said display means so that said displayed region successively changes in size during any time when said central region of said icon is continuously selected by said selecting means.

* * * * *